United States Patent
Baltersee et al.

(10) Patent No.: US 7,203,220 B2
(45) Date of Patent: Apr. 10, 2007

(54) METHOD AND RAKE RECEIVER FOR CODE-TRACKING IN COMMUNICATION SYSTEMS

(75) Inventors: Jens Baltersee, Cologne (DE); Gunnar Fock, Aachen (DE); Peter Schulz-Rittich, Aachen (DE)

(73) Assignee: Agere Systems Inc., Allentown, PA (US)

( * ) Notice: Subject to any disclaimer, the term of this patent is extended or adjusted under 35 U.S.C. 154(b) by 816 days.

(21) Appl. No.: 09/760,094

(22) Filed: Jan. 12, 2001

(65) Prior Publication Data

US 2002/0037028 A1  Mar. 28, 2002

(30) Foreign Application Priority Data

Jan. 14, 2000  (EP)  ................. 00300254

(51) Int. Cl.
 *H04B 1/00* (2006.01)
(52) U.S. Cl. ............. 375/145; 375/142; 375/144; 375/148; 375/149; 375/150
(58) Field of Classification Search ............. 375/130, 375/140, 142, 144–150, 365–368
 See application file for complete search history.

(56) References Cited

U.S. PATENT DOCUMENTS

| | | | |
|---|---|---|---|
| 5,361,276 A | 11/1994 | Subramanian | 375/1 |
| 5,463,660 A * | 10/1995 | Fukasawa et al. | 370/342 |
| 5,719,899 A * | 2/1998 | Thielecke et al. | 375/144 |
| 5,790,588 A * | 8/1998 | Fukawa et al. | 375/148 |
| 5,828,705 A | 10/1998 | Kroeger et al. | 375/326 |
| 5,978,423 A | 11/1999 | Farjh | 375/347 |
| 5,987,014 A * | 11/1999 | Magill et al. | 370/335 |
| 6,034,986 A * | 3/2000 | Yellin | 375/148 |
| 6,137,788 A | 10/2000 | Sawahashi et al. | 370/342 |
| 6,154,443 A * | 11/2000 | Huang et al. | 370/210 |
| 6,175,587 B1 * | 1/2001 | Madhow et al. | 375/148 |
| 6,215,814 B1 | 4/2001 | Ylitalo et al. | 375/148 |
| 6,269,075 B1 * | 7/2001 | Tran | 370/206 |

(Continued)

FOREIGN PATENT DOCUMENTS

EP  0 849 887 A2  12/1997

(Continued)

OTHER PUBLICATIONS

W. Sheen, et al, "A Noncoherent Tracking Loop With Diversity and Multipath Interference Cancellation for Direct-Sequence Spread-Spectrum Systems", "IEEE Transactions On Communications, Nov. 1998 vol. 46, No. 11" pp. 1516-1524.

(Continued)

*Primary Examiner*—Jean B. Corrielus

(57) ABSTRACT

The invention relates to a code-tracking method and a rake receiver for CDMA communication systems of low complexity yielding stable tracking. Received signal are distributed to a plurality of receiver fingers of a rake receiver. Each receiver finger i is assigned to a signal path of the transmitted signal which is subject to phase shift and power dissipation due to reflection, diffraction and scattering. According to the invention in each receiver finger i an estimation of the timing delay $\hat{\tau}^{(i)}$ is provided and interference from other signal components j are subtracted from signal components of the current signal path i (i≠j) yielding a reliable estimated timing delay $\hat{\tau}$.

25 Claims, 6 Drawing Sheets

U.S. PATENT DOCUMENTS

| | | | |
|---|---|---|---|
| 6,272,189 B1* | 8/2001 | Garin et al. | 375/343 |
| 6,456,648 B1 | 9/2002 | Bultan et al. | 375/148 |
| 6,456,653 B1 | 9/2002 | Sayeed | 375/227 |
| 6,473,415 B1* | 10/2002 | Kim et al. | 370/342 |
| 6,480,526 B1 | 11/2002 | Shoki et al. | 375/147 |
| 6,532,254 B1* | 3/2003 | Jokinen | 375/148 |
| 6,535,549 B1 | 3/2003 | Scott et al. | 375/219 |
| 6,567,482 B1* | 5/2003 | Popovic' | 375/343 |
| 6,570,909 B1* | 5/2003 | Kansakoski et al. | 375/148 |
| 6,570,918 B1* | 5/2003 | Rademacher | 375/232 |
| 6,600,729 B1* | 7/2003 | Suzuki | 370/335 |
| 6,633,553 B1* | 10/2003 | Hwang | 370/329 |
| 6,661,835 B1* | 12/2003 | Sugimoto et al. | 375/148 |
| 6,683,924 B1* | 1/2004 | Ottosson et al. | 375/343 |
| 6,707,844 B1 | 3/2004 | Imaizumi et al. | 375/148 |
| 6,714,585 B1* | 3/2004 | Wang et al. | 375/148 |
| 6,747,969 B1* | 6/2004 | Hirsch | 370/342 |
| 6,757,346 B2* | 6/2004 | Saito et al. | 375/349 |
| 6,768,727 B1 | 7/2004 | Sourour et al. | 370/335 |
| 6,785,323 B1* | 8/2004 | Proctor, Jr. | 375/146 |
| 6,798,737 B1* | 9/2004 | Dabak et al. | 370/209 |
| 6,865,218 B1* | 3/2005 | Sourour | 375/148 |
| 2001/0028677 A1* | 10/2001 | Wang et al. | 375/148 |
| 2002/0034218 A1* | 3/2002 | Papasakellariou et al. | 375/148 |
| 2002/0044592 A1 | 4/2002 | Razzell | 375/148 |
| 2002/0051486 A1* | 5/2002 | Aue | 375/150 |
| 2002/0131479 A1* | 9/2002 | Butler et al. | 375/147 |
| 2003/0091104 A1* | 5/2003 | Yellin | 375/148 |
| 2003/0193914 A1 | 10/2003 | Lomp et al. | 370/335 |
| 2005/0265430 A1 | 12/2005 | Ozluturk et al. | 375/145 |

FOREIGN PATENT DOCUMENTS

| | | |
|---|---|---|
| EP | 0 993 127 A1 | 10/1999 |
| WO | WO 95/34140 | 12/1995 |
| WO | WO 00/21209 | 4/2000 |

OTHER PUBLICATIONS

H. Huang, et al, "Improving Detection and Estimation in Pilot-Aided Frequency Selective CDMA Channels" "IEEE 6th International Conference On Universal Person Communications, 1997 vol. 1," pp. 198-201.

European Search Report, dated Jul. 24, 2000.

Vijay K. Garg, "*IS-95 CDMA and CDMA 2000*," Prentice Hall PTR, 2000, pp. 60-70.

Andreas Wilde, "*Extended Tracking Range Delay-Locked Loop*," 1995 IEEE, German Aerospace Research Establishment (DLR), Germany, pp. 1052-1054.

Volker Aue et al., "*A Non-Coherent Tracking Scheme for the RAKE Receiver That Can Cope With Unresolvable Multipath*," ICC '99, Vancouver, Canada, Jun. 1999, pp. 1-5.

Andrew J. Viterbi, "*CDMA Principles of Spread Spectrum Communication*," Addison-Wesley Publishing Company, Library of Congress Cataloging-in-Publication Data, ISBN 0-201-63374-4, 1995, pp. 1-245.

Heinrich Meyr et al., "*Digital Communication Receiver Synchronization, Channel Estimation, and Signal Processing*," Wiley Series in Telecommunications and Signal Processing, Wiley-Interscience Publication, 1998, pp. 1-827.

\* cited by examiner

METHOD AND RAKE RECEIVER FOR CODE-TRACKING IN COMMUNICATION SYSTEMS

CROSS-REFERENCE TO RELATED APPLICATION

This application claims priority of European Patent Application No. 00300254.0, which was filed on Jan. 14, 2000.

DESCRIPTION

1. Field of the Invention

The invention relates to a method and a rake receiver for code-tracking in communication systems in general and in code division multiple access (CDMA) communication systems being subject to multipath fading in particular.

2. Prior Art

Digital wireless communication systems are of increasing interest for all types of data and speech transmission. A frequently used method in particular for mobile cellular communications is code division multiple access (CDMA). For CDMA the signal to be transmitted is typically spread to a multiple of its original bandwidth. The signal with spread bandwidth is less sensitive to interference and the spectral power density is reduced. Commonly, direct sequence CDMA is used, where the signal is multiplied or correlated by a code sequence before modulation. The spread and correlated symbols are called chips. Using a plurality of code sequences being orthogonal to each other a plurality of communication connections can utilise the same frequency band. Due to the orthogonality of the codes the transmitted signals can be decoded or decorrelated uniquely in the receiver. An advantageous group of code sequences are so-called pseudo-noise (PN) bit sequences which are typically used for direct sequence CDMA. CDMA and pseudo-noise correlation are known to those skilled in the art.

However, in a wireless communication system a transmitted signal may still propagate along different paths due to reflection or scattering. Therefore, the signal is received as a superposition of different signal components each propagated along one of the possible paths. As reflected signals will be differently delayed according to their paths compared to each other and compared to the direct signal, each of the signal components of one specific path is interfered by a plurality of other time- and phase-shifted signal components of other paths. If there is no direct sight between the transmitter and the receiver the connection can still be provided by the reflected or scattered signal components, but their interference generally causes disadvantageous effects to the connection performance. Phase-shifted signal components reduce the signal-to-noise ratio of the direct or main signal component and cause power dissipation. Furthermore, the superposition of phase-shifted signals may cause destructive interference between different signal components. These disadvantageous effects reduce the reliability and stability of the decorrelation in the receiver, e.g. increase the bit error rate. Especially when one of the communication partners, e.g. a mobile terminal or phone, is moving these multipath phase shift and interference may change quickly causing a fast fading effect.

To reduce interference of phase shifted signal components several algorithms have been proposed in the past for tracking of the multipath delays. All of them suffer from either high sensitivity to multipath fading and thus reduced performance in such environments, or implementation complexity which is prohibitive for the use in mobile terminals, where size, production cost and power consumption are critical issues. One example for code-tracking is the so-called early-late gate timing error detector (EL-TED), being a natural solution to a mathematical optimisation problem for nondispersive, additive white gaussian noise channels (AWGN). For a detailed description of prior art see Heinrich Meyr, Marc Moeneclaey and Stefan Fechtel, Digital Communication Receivers: Synchronization, Channel Estimation and Signal Processing, John Wiley and Sons, New York, 1998, Heinrich Meyr and Gerd Ascheid, Synchronization in Digital Communications. Vol. 1, John Wiley & Sons, New York, 1990 and A. J. Viterbi, CDMA—Principles of Spread Spectrum Communication, Addison-Wesley Publishing Company, Reading (Mass.), 1995.

The EL-TED is able to track echo path delays, as long as the relative delay between two paths is larger than some threshold. If the relative delay is smaller than the threshold, the EL-TED can no longer distinguish the two paths. Furthermore, tracking of weaker paths (lower power) can be disturbed by stronger paths with a relative delay larger than the aforementioned threshold. For an example of an algorithm with significantly higher implementation complexity than the EL-TED, see R. A. Iltis, An EKF-Based Joint Estimator for Interference, Multipath, and Code Delay in a DS Spread-Spectrum Receiver, IEEE Transactions on Communications, Vol. 42, No. 2/3/4, February–April 1994.

In indoor mobile communication scenarios, the path delay of the last identifiable echo path is small compared to outdoor scenarios. All of the signal energy is dispersed around the path with the shortest delay and a sufficient echo path resolution is critical for adequate receiver performance, expressed for instance as the bit-error rate (BER). None of the existing EL-TED algorithms with reasonable complexity is able to track adjacent path delays which are separated by less than the mentioned threshold. With such a tracking system, the required signal-to-noise ratio to achieve a certain BER is reduced significantly.

A system using multipath interference cancellation in the code-tracking loop was presented by Wern-Ho Sheen and Chien-Hsiang Tai, A Noncoherent Tracking Loop With Diversity and Multipath Interference Cancellation for Direct-Sequence Spread-Spectrum Systems, IEEE Transactions on Communications, Vol. 46, No. 11, November 1998. There, a group of rake fingers is tracked jointly. In each finger, respreading and recoding is performed after the normal rake correlation in order to yield signals which model the interference for each multipath. These interference terms can then be subtracted from the incoming signal in order to improve the tracking performance, inherently by allowing a finger assignment where adjacent fingers are placed around one chip duration apart. This scheme suffers from high implementation complexity, expressed by the respreading and recoding necessary in each finger.

SUMMARY OF THE INVENTION

Therefore, it is an object of the present invention to provide a method and/or a rake receiver for code-tracking in CDMA communication systems of low complexity and cost. Another object is to provide a method and/or rake receiver with stable and reliable code-tracking as well as improved performance, reducing the disadvantages of the prior art.

According to the present invention an electromagnetic signal of a CDMA communication system is received. The received signal is generated from the transmitted signal by a superposition of signal components of different signal paths. The transmitted signal is preferably spread and coded by a pseudo-noise bit sequence. In particular, different signal paths are created by scattering, diffraction and/or reflection of the signal. Therefore, the signal components may be time- and phase-shifted to each other and having different amplitudes.

The received signal is preferably filtered and digitised by an analog-to-digital (A/D) converter. The digitised signal is distributed or conveyed to a plurality (N) of receiver fingers which are constituents of a so-called rake receiver.

Furthermore, the digitised signal is distributed or conveyed to a detection and a synchronising streams or branches, preferably in each of the receiver fingers. The signal is preferably distributed by a digital interpolator/decimator.

In the detection and synchronisation streams the signal is preferably correlated with the complex-conjugate of the pseudo-noise bit sequence used in the transmitter. The decorrelated signal in the synchronisation stream is multiplied with reconstructed transmitted symbols.

The method further comprises a step of reducing interference of at least one signal component of signal path j with the signal component of signal path i by an interference reduction device of a receiver finger which is assigned to signal path i, where i≠j.

Preferably reducing of interference comprises a subtraction of an interference signal from the decorrelated digitised signal. The interference signal is preferably calculated using the complex weight coefficients of at least one or all signal paths j (j≠i). Preferably the subtraction takes place on symbol rate 1/T. Preferably, interference reduction is provided in each rake finger. Advantageously, interference reduction provides a stable and reliable code-tracking of low complexity and cost. Furthermore, the method and device according to the invention yield an improved estimation of the timing delay τ.

In a preferred embodiment of the invention the decorrelation by the pseudo-noise sequence takes place in a timing error detector which includes a first and second correlators. The digitised signal is transmitted to the first correlator and the time-shifted signal is transmitted to the second correlator. The signals are correlated, preferably multiplied with the complex-conjugate of the pseudo-noise sequence in the first and second correlator, respectively, and the two resulting output signals are subtracted. The decorrelated signal is preferably multiplied with reconstructed transmitted symbols.

In a further embodiment the real part of the complex output signal of the interference reduction device is filtered. The output signal of the filter provides an estimated time delay $\hat{\tau}^{(i)}$ for the signal component of the respective signal path i.

The invention is described in detail hereinafter by means of preferred embodiments and reference is made to the attached drawings.

BRIEF DESCRIPTION OF THE FIGURES

It is shown in

DETAILED DESCRIPTION OF THE INVENTION

The block diagrams of FIGS. 1, 3, 5 and 6 can also be read as flow charts of the method according to the invention. Same or equivalent items of the conventional timing error detector 102' shown in FIG. 2 and of the timing error detector 102 according to the present invention are denoted by the same numerals.

Figure 1:
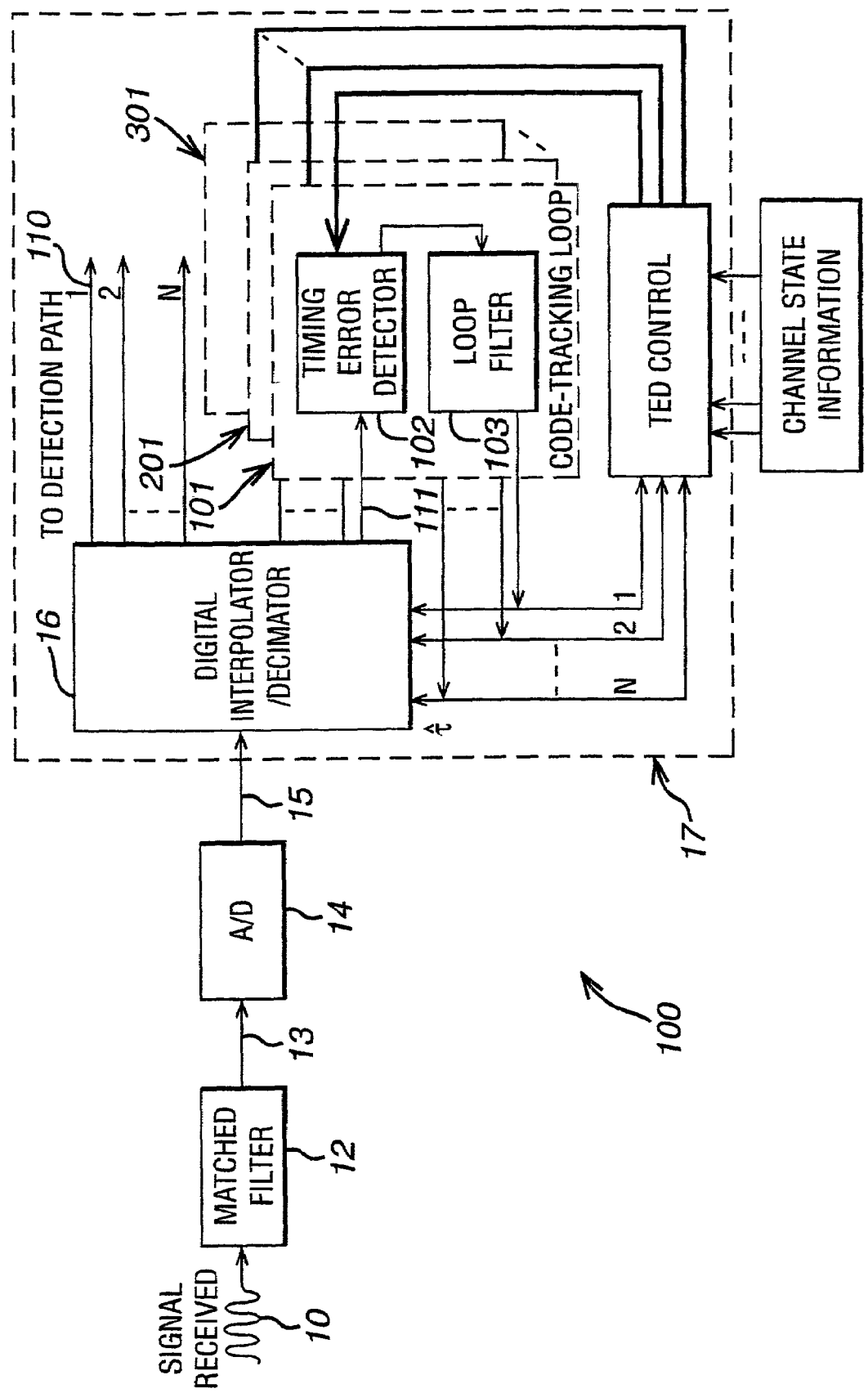
FIG. 1 a block diagram of a rake receiver with N receiver fingers.

FIG. 1 presents the general structure of code-tracking loops for a plurality of receiver fingers 1, 2, ..., N of a rake receiver 17 for a direct sequence CDMA communication system. For direct sequence CDMA the signal is spread by a factor of $2^L$ in the transmitter and multiplied by a code sequence before modulation, yielding chips of a duration $T_C$. For the preferred embodiment quadrature phase shift keying (QPSK) and a pseudo-noise (PN) code sequence 112 are used. Also binary phase shift keying (BPSK) or any other linear modulation scheme can be applied.

Figure 2:
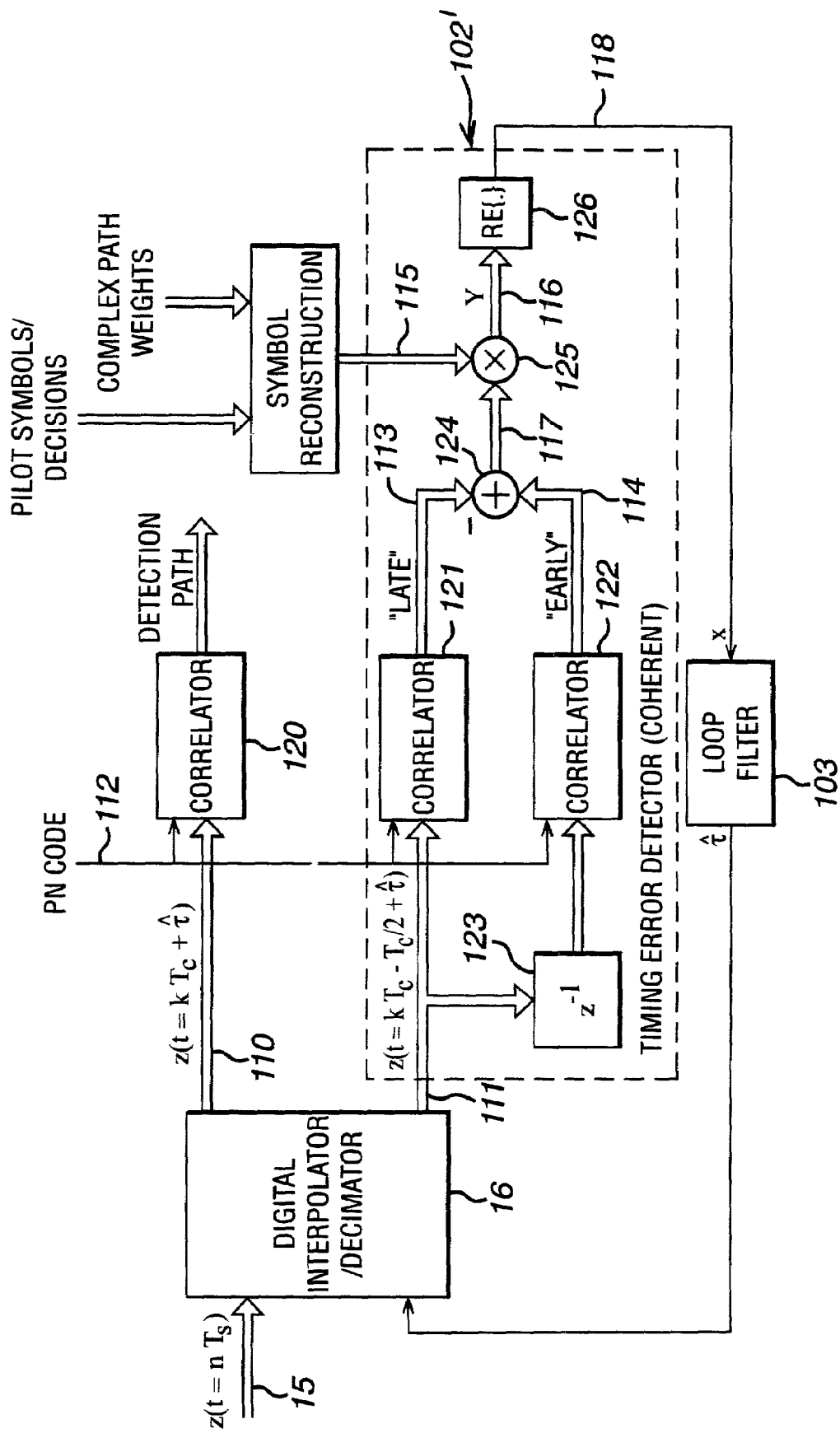
FIG. 2 a block diagram of a receiver finger i of a rake receiver with a conventional coherent early-late timing error detector, FIG. 3 a block diagram of a receiver finger i of the rake receiver of FIG. 1 with an early-late timing error detector according to a first embodiment of the invention, FIG. 4 a diagram of the detector characteristic of a conventional coherent early-late timing error detector, FIG. 5 a diagram of the detector characteristic of a conventional coherent early-late timing error detector for two signal components i and j, FIG. 6 a block diagram of a receiver finger i of a rake receiver according to a second embodiment of the invention and FIG. 7 a block diagram of a receiver finger i of a rake receiver according to a third embodiment of the invention.
Figure 3:
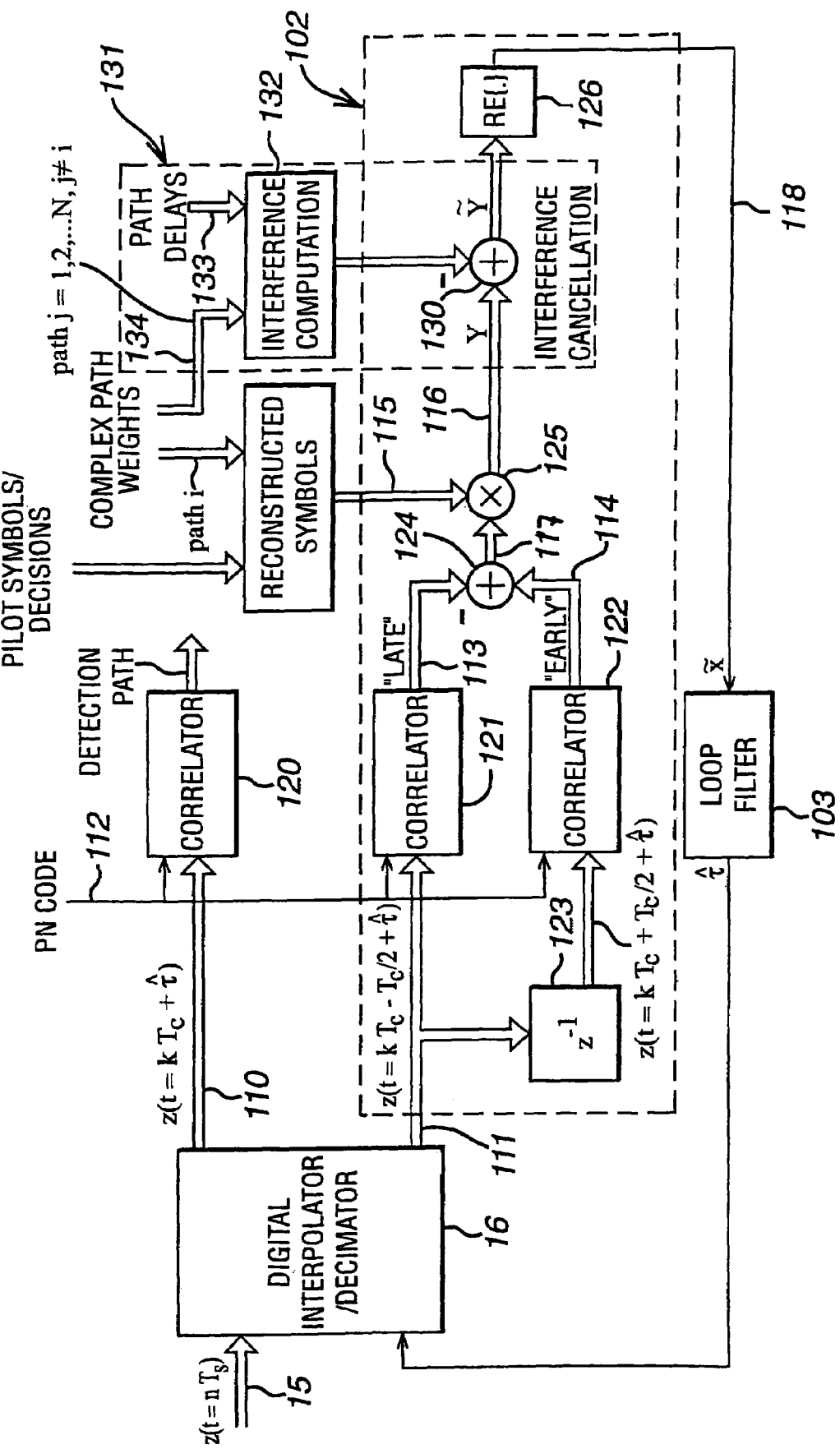

A digital spread spectrum rake receiver 17 including a digital interpolator/decimator 16 is shown in FIG. 1. A wirelessly transmitted signal 10 is received by the device 100 and is fed through a pulse matched filter 12. The filter 12 is a root raised-cosine pulse filter, matched to the transmission filter (not shown) which is also of root raised-cosine shape in the transmitter (not shown). As best seen in FIG. 2 and 3 an analog-to-digital (A/D) converter 14 generates samples $z(t=n*T_S)$ 15 of the pulsed matched-filtered signal 13 at equidistant times t which are integer multiples n of the sample time $T_S$ and feeds them to the digital interpolator/decimator 16. The digital interpolator/decimator 16 generates intermediate samples $z(t=k*T_C+\hat{\tau})$ 110 of the same signal at equidistant times t which are integer multiples k of the chip duration $T_C$ shifted by estimated timing instants $\hat{\tau}$ for each of the N identical rake fingers. The signal is sampled at a rate which is higher than the chip rate, typical oversampling factors are in the range of four to eight. The digital interpolator/decimator 16 interpolates between the samples, as sampling rate $1/T_S$ and chip rate $1/T_C$ can be different, and performs a sampling rate conversion from the sampling rate to the chip rate.

The interpolated signal 110 is fed to the detection stream or branch, where a correlation of the signal 110 with the complex-conjugate pseudo-noise (PN) code 112 in each of the N fingers takes place. In the detection stream path delay and phase shift of each signal component is equalised and the signal amplitude is optimised. For reconstruction of the transmitted symbols phase shift elimination and amplitude optimisation is achieved by multiplication of the signal with the complex-conjugate path weight $c_k^{(i)*}$. This reconstruction yields an enhancement of the strong signal paths and an additional weakening of already weak signal paths. After this reconstruction the signals of all fingers are added up in a combiner (not shown).

Furthermore, the signal is fed from the digital interpolator decimator 16 to N code-tracking loops, where exemplary the code-tracking loops of finger 1, finger 2 and finger N are denoted 101, 201 and 301, respectively, as seen in FIG. 1. Each of the N code-tracking loops includes a timing error detector (TED) which generates error signals that are substantially proportional to the remaining path delay error in the signal. The timing error detector of the first code-tracking loop or first finger is denoted 102. The error signals are lowpass-filtered in a loop filter to yield estimates for the respective path delay, again for each finger, which are then fed back to a respective input of the interpolator/decimator 16, closing the tracking loop.

A conventional coherent early-late timing error detector 102' embedded in a code-tracking loop for one of the fingers i of a rake receiver is depicted in FIG. 2. The timing error detector and other components downstream of the digital interpolator/decimator 16 is replicated for each rake finger $i \in \{1, 2, \ldots, N\}$, whereas the interpolator/decimator 16 is used jointly. The samples $z(t=n*T_S)$ 15 of the incoming signal are interpolated and decimated at the estimated timing delay $\hat{\tau}^{(i)}$ for the respective signal path assigned to the finger i. A first and second data streams are generated, the first stream is fed to the detection stream or path, more specifically to a correlator 120. It is noted that the detection stream is not shown in full detail. The second data stream is fed to the synchronisation stream or path, more specifically to a correlator 121 and a shifter component ($z^{-1}$) 123. In the first stream the samples $z(t=k*T_C+\hat{\tau})$ 110 are correlated with the pseudo-noise code 112 in the correlator 120. In the second or synchronisation stream shifted samples $z(t=k*T_C-T_C/2+\hat{\tau})$ 111, spaced by $-T_C/2$ with respect to the samples in the detection stream, are correlated with the pseudo-noise code in the correlator 121. Shifted samples 111 are further shifted by $+T_C$ in the component 123 to feed samples $z(t=k*T_C+T_C/2+\hat{\tau})$ in the correlator 122. The two correlators 121, 122 of the synchronisation stream yielding early and late estimates 114, 113 of the transmitted symbols. Estimates 113, 114 are substantially raised-cosine functions. If synchronisation of the samples is perfect, i.e. estimated time delay $\hat{\tau}$ is close to the real delay of the respective signal path, early and late estimates are spaced by $+/-T_C/2$ from the maximum of said raised-cosine function, respectively, and the difference of early and late estimates provided in step 124 is close to zero. When estimated delay $\hat{\tau}$ moves away from the real delay, difference of early and late estimates become finite yielding a delay compensation in the digital interpolator/estimator. Thus the tracking loop provides a synchronisation or locking loop for the digital signal. According to a next step 125 the difference signal 117 is multiplied with reconstructed transmitted symbols 115. Reconstructed transmitted symbols 115 are generated by complex-conjugately multiplying pilot symbols, e.g. of training sequences or symbol decisions with estimates of the channel phase or the channel phasor, but other methods of symbol reconstruction can also be applied. The real part of the resulting samples is extracted by circuit 126, now on symbol rate 1/T, as error signal $\tilde{x}$ 118. Error signal 118 is fed through the loop filter 103 with lowpass characteristic to yield the estimate for the timing delay $\hat{\tau}^{(i)}$. The general method of timing error detection is known in the art and e.g. described in Heinrich Meyr, Marc Moeneclaey and Stefan Fechtel, Digital Communication Receivers: Synchronization, Channel Estimation and Signal Processing, John Wiley and Sons, New York, 1998, A. J. Viterbi, CDMA—Principles of Spread Spectrum Communication, Addison-Wesley Publishing Company, Reading (Mass.), 1995, A. Wilde, Extended tracking range delay-locked loop, Proceedings of the International Conference on Communications, Seattle, USA, 1995 and Volker Aue and Gerhard P. Fettweis, A Non-Coherent Tracking Scheme for the RAKE Receiver That Can Cope With Unresolvable Multipath, Proceedings of the International Conference on Communications, Vancouver, Canada, 1999. Herewith, said documents are incorporated by reference.

FIG. 3 shows one of the identical receiver fingers with an early-late timing error detector 102 with adaptive interference reduction at symbol rate according to the invention, embedded in a code-tracking loop for one of the fingers i in the rake receiver 17. Ideally interference is nearly cancelled as result of signal subtraction 130 in an interference reduction device 131. The chiprate processing part is equivalent to that of the conventional timing error detector 102' shown in FIG. 2.

According to the present invention the error signal coming out of the timing error detector 102 and going into the loop filter 103, is modified in the inventive timing error detector adaptively by computing the interference from adjacent multipaths. After multiplication of the reconstructed symbols in the current finger i according to step 125, interference from other fingers j ($j \neq i$) is subtracted in step 130 from an intermediate signal 116 on symbol rate 1/T. For computing the interference channel state information such as path amplitudes and phases as well as path locations (relative to the current path i) are used. The path locations are inherently available from the tracking loops of the other rake fingers j ($j \neq i$), while the path amplitudes and the phases can be derived from the channel tracking units (not shown) of the other fingers.

As an alternative to interpolating and decimating the data signal 15 for each rake finger, the pseudo-noise code 112 can also be shifted in order to guarantee the correct alignment between data samples and pseudo-noise code samples. Furthermore, due to normally very slowly varying path delays, delay tracking of all fingers can be implemented in time-sharing using only one dedicated tracking structure in an alternative embodiment of the invention.

Figure 4:
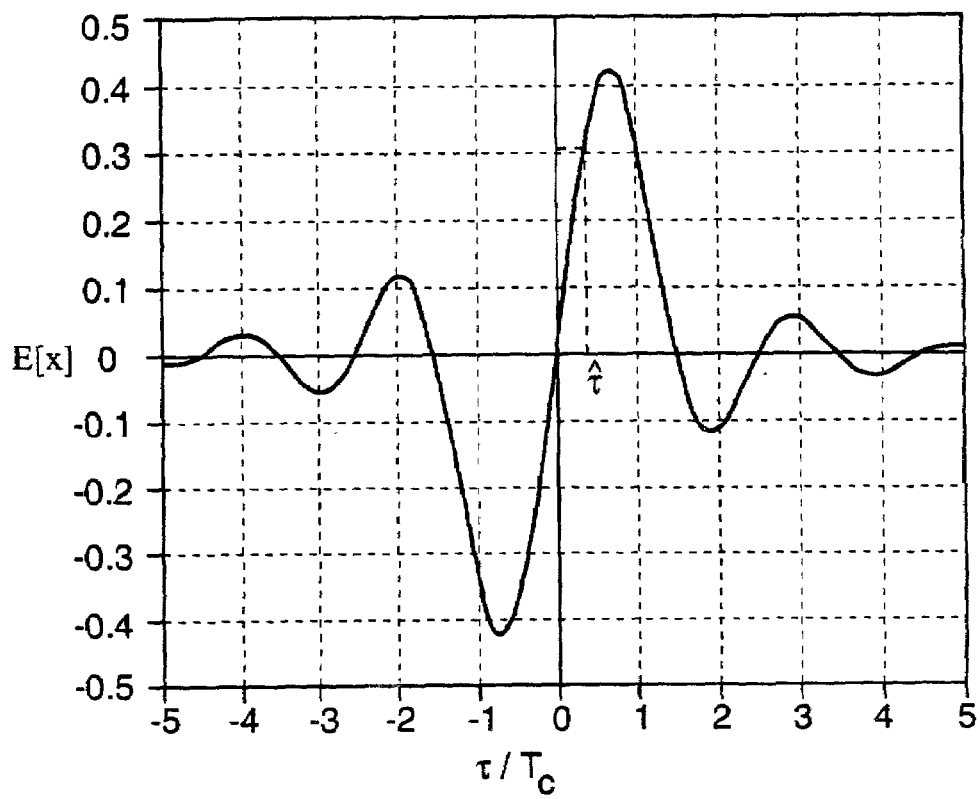

A typical detector characteristic for the conventional coherent timing error detector, also called S-curve, is depicted in FIG. 4. The S-curve depends on the pulse filter used in the transmitter and the corresponding matched filter 12 in the receiver. FIG. 4 shows the expected value of the error signal $x^{(i)}$ for an additive white gaussian noise channel and a raised-cosine pulse-matched filter autocorrelation function. The current path and as such the current rake finger is denoted by index i or exponent (i). In a multipath environment, the timing error detection is influenced by adjacent multipaths lying everywhere but in the zero-crossings of the S-curve. As an example, FIG. 5 further shows an S-curve of a second path j, causing a weaker signal component than path i and being time-shifted approximately by one chip duration $T_C$ with respect to path i. It is clearly seen that at the usual location of operation of the tracking loop for finger i which is the origin in the diagram, an additive interference from finger j will degrade the performance of the timing error detection. The interference depends on the distance of the two paths i and j, on the instantaneous amplitude and also on the phase relation.

If the current channel conditions are known, either perfect or by means of estimates, i.e. path amplitudes and phases as well as path delays are known, the interference from other fingers are estimated and subtracted from the timing error signal of the current finger. The rake receiver has a total of N fingers, and complex instantaneous channel tap phasors, which include amplitude and phase information, are denoted by the complex vector $c_k = [c_k^{(1)} \ldots c_k^{(N)}]$. Furthermore, the path delays are given by $\tau=[\tau_k^{(1)} \ldots \tau_k^{(N)}]$, where index k defines the current symbol for the path delays and the phasors.

Figure 5:
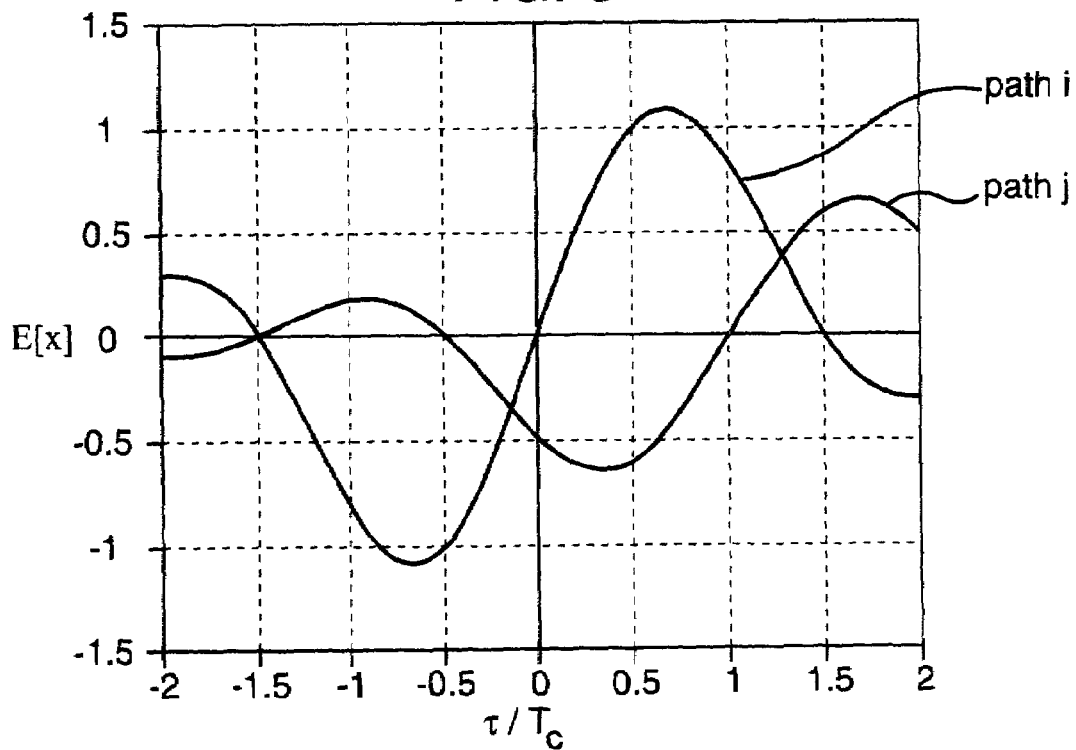

The advantages of the inventive timing error detection will be clear from FIG. 4 and 5 representing the expected value of the error signal E[x] for a non interfered path i (FIG. 4) and exemplary for another scenario where two paths i and j are interfering each other (FIG. 5). As shown in FIG. 4 the S-Curve is a function of the path delay $\tau$, therefore, shall be denoted by $S(\tau)$ and is determined by the structure of the early-late timing error detector. On the x-and y-axis the timing delay $\tau$ in units of $T_c$ and the expected value E[x] are plotted, respectively. As long as the path i is not interfered the conventional timing error detector is unbiased, i.e. the value of the S-curve at the origin is zero, as shown in FIG. 4. FIG. 5 depicts the signal components for two different signal paths i and j, where the amplitude of component j is lower than the one of component i. The timing error detector for finger i is now biased, meaning that the superimposed contribution from path j results in a nonzero value of the S-curve for finger i at the origin. In advantageous contrast to that the timing error detector for finger i according to the invention subtracts interference of path j from the signal component of path i such that reliable and stable path delay estimation and tracking in the tracking loop is provided for each signal component.

To provide the above described interference reduction the S-curve of the transmission system is stored in an interference computation module 132 being part of the interference reduction device 131. The interference computation module 132 receives the path delays 133

$$\hat{\tau}_k^{(i)}$$

and $$\hat{\tau}_k^{(j)}$$

for the assigned signal path i and for all other paths j≠i, respectively. Further, module 132 receives the complex path weights $c_k^{(j)}$ 134 of all other paths j≠i than the assigned signal path i.

In particular, for path i, the interference estimates of all other fingers are subtracted from the intermediate signal $y_k^{(i)}$ 116 according to $$\tilde{x}_k^{(i)} = Re\left\{y_k^{(i)} - \sum_{j=1,j\neq i}^{M} c_k^{(i)*} c_k^{(j)} S(\hat{\tau}_k^{(i)} - \hat{\tau}_k^{(j)})\right\} \quad (1)$$

The first factor $c_k^{(i)*}$ accounts for the complex-conjugate of the maximum ratio coefficient used in finger i. The second factor $c_k^{(j)}$ stands for the channel tap phasor which the interfering path is subject to on the channel itself. The product of both is the total weight the interfering path is subject to in finger i, and multiplied with the S-curve at the estimated correct location, $$\hat{\tau}_k^{(i)} - \hat{\tau}_k^{(j)},$$

it results in the interference contribution of finger j to finger i. The storage of S in the module 132 may be either by means of a mathematical function (e.g. an approximation by sin $(\tau)/\tau$) such that $$S(\hat{\tau}_k^{(i)} - \hat{\tau}_k^{(j)})$$

is calculated for each argument or S is stored by means of a look-up table such that the values of the function S are interpolated from the table values.

In the exemplary embodiment depicted in FIGS. 1 and 3 the inventive timing error detection is applied for all receiver fingers i∈{1, 2, . . . , N}. Thus the invention yields for each finger i an interference cancelled or at least reduced error signal $$\tilde{x}_k^{(i)}$$

118 and an interference reduced estimated timing delay $$\hat{\tau}_k^{(i)}$$

after the loop filter 103. Therefore, a significantly improved tracking is provided for all paths compared to prior art.

Figure 6:
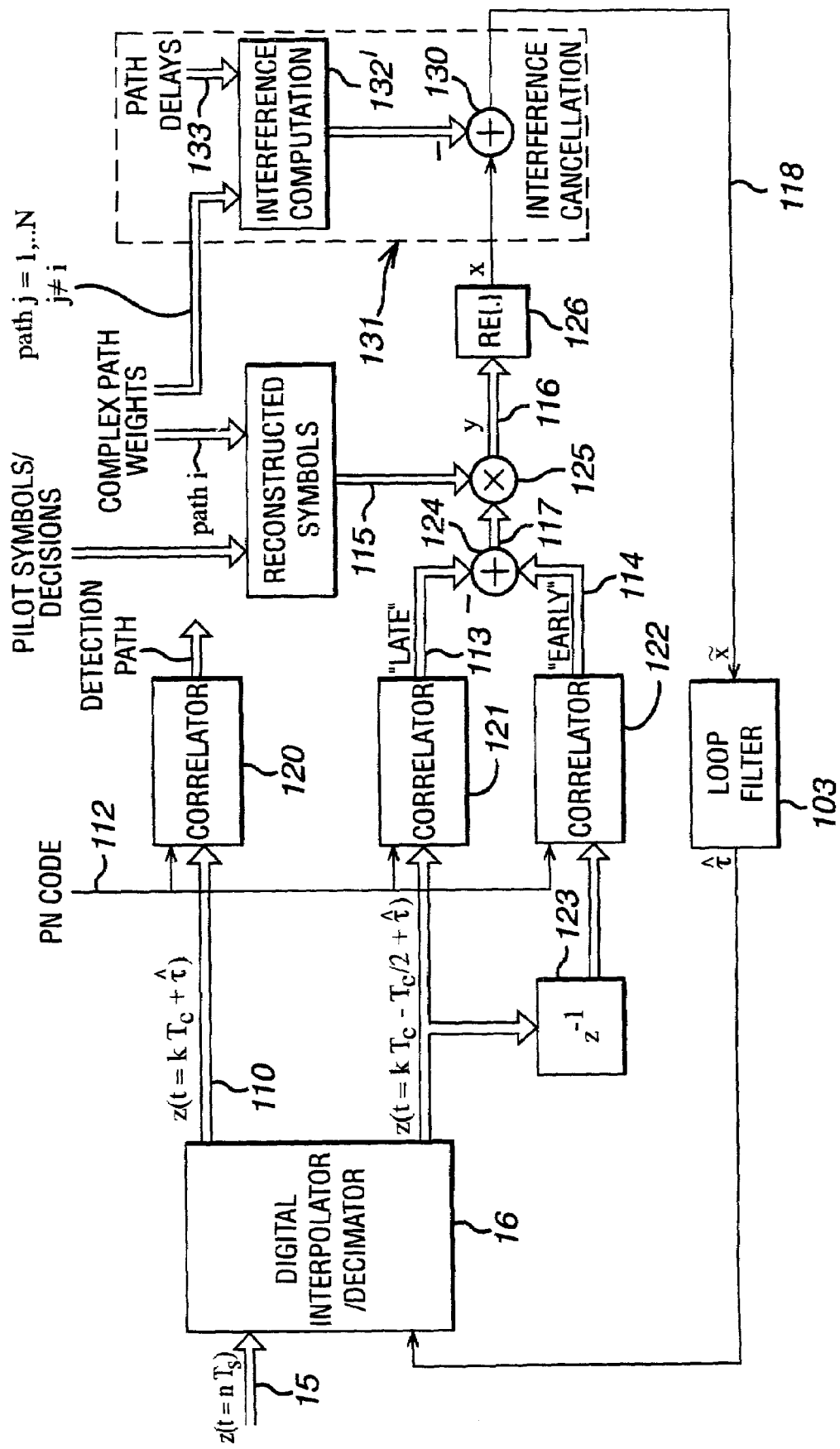

In another preferred embodiment, shown in FIG. 6, the real part of the intermediate signal $y_k^{(i)}$ 116 is extracted before reducing the interference. For this embodiment interference computation 132' is simplified by computing only the real part of the sum in Eq. (1) and it becomes $$\tilde{x}_k^{(i)} = x_k^{(i)} - \sum_{j=1,j\neq i}^{M} Re\{c_k^{(i)*} c_k^{(j)}\} S(\hat{\tau}_k^{(i)} - \hat{\tau}_k^{(j)}) \quad (2)$$

Figure 7:
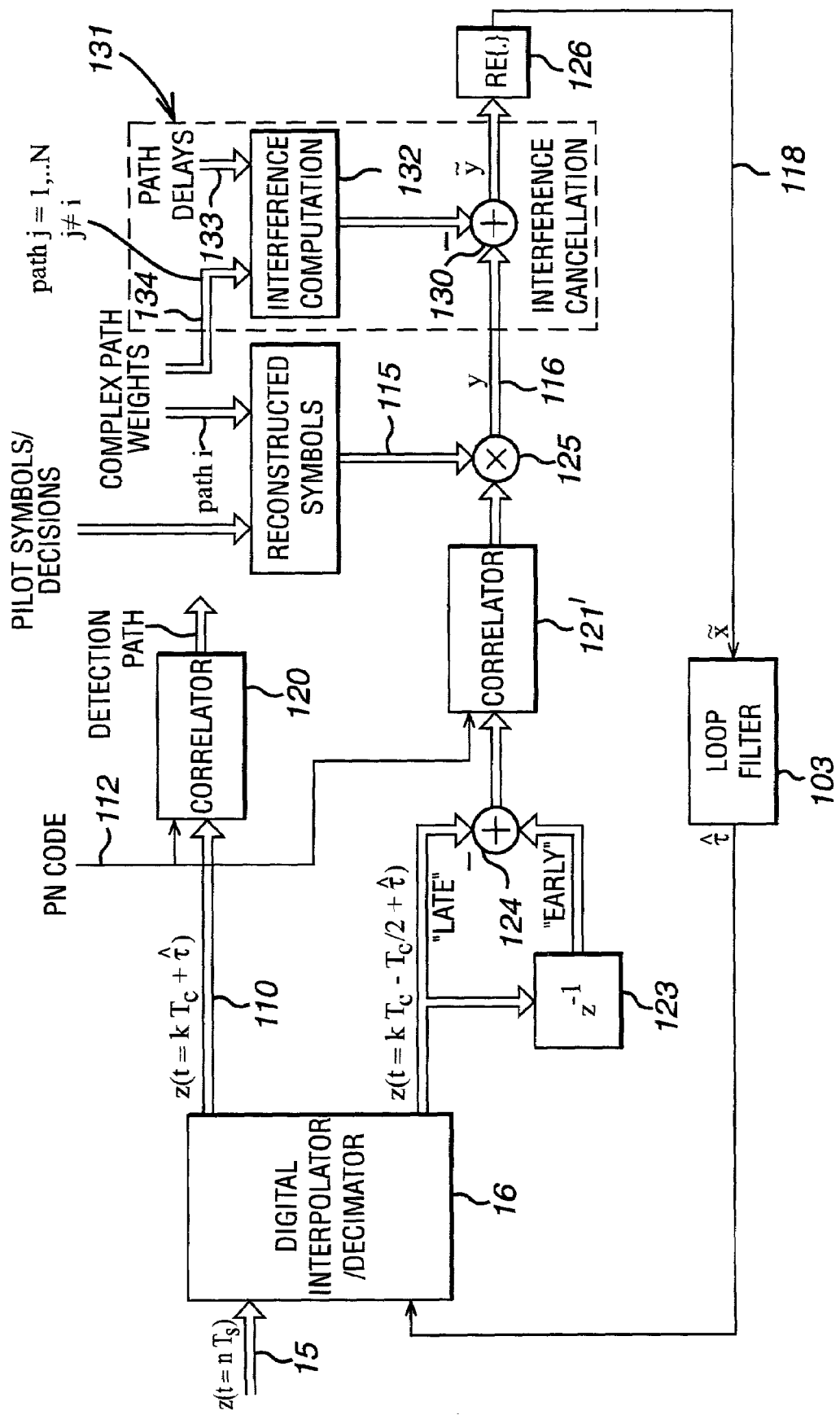

FIG. 7 shows an alternative early-late structure, where the order of correlation and subtraction has been reversed. This is allowable due to the linear nature of the correlation operation and yields a simplified structure with only one correlator 121'.

What is claimed:

1. A method for code-tracking in a CDMA communication system, the method comprising:
    (a) receiving an electromagnetic signal comprising a superposition of a plurality of signal components of different signal paths corresponding to a transmitted user signal that was spread with a code sequence,
    (b) digitizing a signal derived from the electromagnetic signal,
    (c) distributing the digitised signal to a plurality of receiver fingers of a rake receiver, each finger being assigned to a different one of the signal paths,
    (d) distributing the digitised signal in each finger to a detection branch and a synchronizing branch,
    (e) decorrelating at least one signal derived from the digitised signal in a first finger of the rake receiver corresponding to a first signal path using the code sequence in the synchronizing branch to generate an intermediate signal for the first signal path corresponding to the first finger, and
    (f) reducing the interference of at least one other signal component of at least one other signal path corresponding to at least one other finger of the rake receiver with the signal component of the first signal path corresponding to the first finger by:
calculating the interference contribution of the at least one other finger in the first finger; and
subtracting, for the first signal path, the interference contribution of the at least one other finger from the intermediate signal to produce an interference reduced signal.

2. A method according to claim 1, wherein step (f) further comprises the steps of:
storing an S-curve for the CDMA communication system in an interference computation module; and
calculating the interference contribution of the at least one other finger in the first finger by multiplying a total weight of an interfering path corresponding to the at least one other finger by the S-curve at an estimated correct location.

3. A method according to claim 1 wherein the subtracting takes place on symbol rate (1/T).

4. A method according to claim 1, wherein interference of other signal components than the first signal component is reduced in all of the receiver fingers.

5. A method according to claim 1, wherein:
the code sequence is a complex-conjugate pseudo-noise code sequence; and
step e) comprises decorrelating the at least one signal by multiplying the at least one signal with the complex-conjugate pseudo-noise code sequence.

6. A method according to claim 1, comprising determining after step f) the real part of the interference reduced signal.

7. A method according to claim 1 comprising determining before step f) the real part of the intermediate signal, wherein the interference contribution is subtracted from the real part of the intermediate signal to produce the interference reduced signal.

8. A method according to claim 1, comprising filtering after step f) the interference reduced signal.

9. A method according claim 8, wherein steps e), f) and the filtering step provide code-tracking of the digitised signal.

10. A method according to claim 9, wherein the code-tracking provides an estimated timing delay of the signal component of the first signal path.

11. A method according to claim 1 wherein step e) comprises distributing the digitised signal to a first and second correlator.

12. A method according claim 11, comprising time-shifting the digitised signal prior to feeding it to the second correlator providing late and early estimates as output of the first and second correlators respectively.

13. A method according to claim 12, comprising subtracting the early and late estimates yielding a difference signal.

14. A method according to claim 13, comprising multiplying the difference signal with reconstructed transmitted symbols to generate the intermediate signal.

15. A method according claim 1, wherein step (f) comprises using complex path weights and path delays to compute the interference contribution of the at least one other signal component with the signal component of the first signal path.

16. A rake receiver for processing a digitized signal corresponding to a received electromagnetic signal comprising a superposition of a plurality of signal components of different signal paths corresponding to a transmitted user signal that was spread with a code sequence, the rake receiver comprising a plurality of fingers, wherein a first finger is adapted to process a signal component corresponding to a first signal path, wherein the first finger comprises:
a detection path adapted to receive and process a first version of the digitized signal; and
a code-tracking loop adapted to receive and process a second version of the digitized signal to determine a path delay error for the signal component corresponding to the first signal path, wherein the code-tracking loop comprises:
a timing error detector adapted to generate error signals based on the second version of the digitized signal; and
a loop filter adapted to filter the error signals from the timing error detector to generate the path delay error, wherein the timing error detector comprises:
a correlator adapted to decorrelate at least one signal derived from the second version of the digitized signal using the code sequence to generate an intermediate signal;
an interference reduction device adapted to reduce the interference of at least one other signal component of at least one other signal path corresponding to at least one other finger of the rake receiver with the signal component of the first signal path corresponding to the first finger by:
calculating the interference contribution of the at least one other finger in the first finger; and
subtracting, for the first signal path, the interference contribution of the at least one other finger from the intermediate signal based on the first decorrelated signal.

17. A rake receiver according to claim 16, wherein the interference reduction device comprises an interference computation module being adapted to receive complex path weights and path delays to compute the interference contribution of the at least one other signal component with the said signal component of the first signal path.

18. A rake receiver according to claim 16, comprising an A/D-converter upstream of the receiver fingers, for digitizing the signal derived from the electromagnetic signal.

19. A rake receiver according to claim 16, wherein the timing error detector is an early-late gate timing error detector further comprising a second correlator adapted to decorrelate another version of the digitized signal to generate a second decorrelated signal, wherein the intermediate signal is generated based on the two decorrelated signals.

20. A rake receiver according to claim 16, wherein the timing error detector is adapted to provide pseudo-noise decorrelation.

21. A rake receiver according to claim 16, wherein the rake receiver is adapted for direct-sequence code-division multiple access communication.

22. A rake receiver according to claim 16, wherein the interference reduction device is adapted to:
store an S-curve for a CDMA communication system; and
calculate the interference contribution of the at least one other finger in the first finger by multiplying a total weight of an interfering path corresponding to the at least one other finger by the S-curve at an estimated correct location.

23. Apparatus for code-tracking in a CDMA communication system, the apparatus comprising:
means for receiving an electromagnetic signal comprising a superposition of a plurality of signal components of different signal paths corresponding to a transmitted user signal that was spread with a code sequence;

means for digitizing a signal derived from the electromagnetic signal;

means for distributing the digitised signal to a plurality of receiver fingers of a rake receiver, each finger being assigned to a different one of the signal paths;

means for distributing the digitised signal in each finger to a detection branch and a synchronizing branch;

means for decorrelating at least one signal derived from the digitised signal in a first finger of the rake receiver corresponding to a first signal path using the code sequence (112) in the synchronizing branch to generate an intermediate signal for the first signal path corresponding to the first finger, and means for reducing the interference of at least one other signal component of at least one other signal path corresponding to at least one other finger of the rake receiver with the signal component of the first signal path corresponding to the first finger by:

calculating the interference contribution of the at least one other finger in the first finger; and subtracting, for the first signal path, the interference contribution of the at least one other finger from the intermediate signal.

24. An apparatus according to claim 23, wherein the means for reducing interference comprises:

means for storing an S-curve for the CDMA communication system in an interference computation module; and means for calculating the interference contribution of the at least one other finger in the first finger by multiplying a total weight of an interfering path corresponding to the at least one other finger by the S-curve at an estimated correct location.

25. An apparatus according claim 23, wherein the means for reducing interference comprises means for using complex path weights and path delays to compute the interference contribution of the at least one other signal component with the signal component of the first signal path.

* * * * *